(12) United States Patent
Öberg et al.

(10) Patent No.: US 9,004,205 B2
(45) Date of Patent: Apr. 14, 2015

(54) MULTI-VEHICLE ARRANGEMENT FOR HEAVY HAULAGE

(75) Inventors: Jan Öberg, Göteborg (SE); Niklas Öberg, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/126,408

(22) PCT Filed: Jun. 14, 2011

(86) PCT No.: PCT/EP2011/002900
§ 371 (c)(1),
(2), (4) Date: Dec. 18, 2013

(87) PCT Pub. No.: WO2012/171536
PCT Pub. Date: Dec. 20, 2012

(65) Prior Publication Data
US 2014/0110184 A1    Apr. 24, 2014

(51) Int. Cl.
*A01B 71/06* (2006.01)
*B62D 53/00* (2006.01)
*B60K 5/08* (2006.01)
(Continued)

(52) U.S. Cl.
CPC . *B62D 53/00* (2013.01); *B60K 5/08* (2013.01); *B60Y 2200/44* (2013.01); *B60W 50/0098* (2013.01); *B60W 30/1843* (2013.01); *B60W2050/0006* (2013.01); *B60W 2300/12* (2013.01); *B60W 2300/14* (2013.01)

(58) Field of Classification Search
USPC .............. 280/408, 409; 180/14.1, 14.4, 14.7, 180/14.5
See application file for complete search history.

(56) References Cited

U.S. PATENT DOCUMENTS 4,469,187 A * 9/1984 Hagin et al. ................. 180/14.2
4,794,867 A * 1/1989 Titz .................................. 105/3
(Continued)

FOREIGN PATENT DOCUMENTS

AU          72039 01 A    11/2001
AU       2002 350 555 B2    6/2007
(Continued)

OTHER PUBLICATIONS

International Search Report (Apr. 12, 2012) for corresponding International Application PCT/EP2011/002900.
(Continued)

*Primary Examiner* — Kevin Hurley
*Assistant Examiner* — Marlon Arce
(74) *Attorney, Agent, or Firm* — WRB-IP LLP

(57) ABSTRACT

A multi-vehicle arrangement for heavy haulage includes at least a first tractor unit mechanically connected with a second tractor unit, wherein each tractor unit forms a separately drivable tractor unit including a driver cab), a digital communication device, steering wheels, a braking system, and a power train comprising a power source, a friction clutch, and an automatic transmission, where the friction clutch is arranged to be disengaged or engaged for drive torque transmission from the power source to the automatic transmission, a digital communication link is provided between the tractor units by the digital communication devices, and a control system of the first tractor unit is arranged to control at least a clutch load of the friction clutch of each of the first and second tractor units for the purpose of reducing the risk of overheating of any of the friction clutches during engagement or disengagement of the friction clutches.

14 Claims, 1 Drawing Sheet

(51) Int. Cl.
   *B60W 50/00*   (2006.01)
   *B60W 30/184*   (2012.01)

(56) References Cited

U.S. PATENT DOCUMENTS

| | | | |
|---|---|---|---|
| 6,880,651 B2 * | 4/2005 | Loh et al. | 180/14.2 |
| 7,784,812 B1 * | 8/2010 | Lares | 280/474 |
| 8,469,384 B2 * | 6/2013 | Andre | 280/408 |
| 2001/0003393 A1 | 6/2001 | Cooper | |

FOREIGN PATENT DOCUMENTS

| | | |
|---|---|---|
| DE | 43 24 211 A1 | 1/1995 |
| EP | 0 277 305 A1 | 8/1988 |
| WO | 03/022665 A1 | 3/2003 |

OTHER PUBLICATIONS

European Official Action (Oct. 8, 2014) for corresponding European App. 11 726 344.2.

* cited by examiner

MULTI-VEHICLE ARRANGEMENT FOR HEAVY HAULAGE

BACKGROUND AND SUMMARY

The present invention relates to a multi-vehicle arrangement for heavy haulage comprising at least a first tractor unit mechanically connected with a second tractor unit.

Heavy haulage relates to road transport of abnormal loads. This is normally performed by means of a tractor unit and a customised trailer adapted for the abnormal load. The load can for example be abnormal in weight and/or in size. One prior art solution for transporting even larger loads is given in US 2001/0003393, where a multi-combination vehicle comprising a prime mover including a first power source arranged in the prime mover, and a trailer mechanically coupled to the prime mover and including a second power source arranged in the trailer. The increased power provided from the second power source results in improved power-to-weight ratio of the vehicle.

One specific problem with the solution according to the prior art is that the carrier must be specifically designed, and subsequently manufactured in a very low number of units due the limited demand of such a highly specialised device, leading to high costs of the overall vehicle arrangement.

There is thus a need for an improved vehicle arrangement for heavy haulage purposes that removes the above mentioned disadvantage.

It is desirable to provide an inventive multi-vehicle arrangement for heavy haulage, where the previously mentioned problems are partly avoided. According to an aspect of the present invention, each tractor unit forms a separately drivable tractor unit comprising a driver cab, a digital communication device, steering wheels, a braking system, and a power train comprising a power source, a friction clutch, and an automatic transmission, where said friction clutch is arranged to be disengaged or engaged for drive torque transmission from said power source to said automatic transmission, a digital communication link is provided between said tractor units by means of said digital communication devices, and a control system of said first tractor unit is arranged to control at least a clutch load of said friction clutch of each of said first and second tractor units for the purpose of reducing the risk of overheating of any of said friction clutches during engagement or disengagement of said friction clutches.

According to an aspect of the present invention, a method includes the steps of providing each tractor unit as a separately drivable tractor unit comprising at least a driver cab, a digital communication device, steering wheels, a braking system, and a power train comprising a power source, a friction clutch, and an automatic transmission, where said friction clutch is arranged to be disengaged or engaged for drive torque transmission from said power source to said automatic transmission. Further providing a digital communication link between said tractor units by means of said digital communication devices, and controlling at least a clutch load of said friction clutch of each of said first and second tractor units by means of a control system of said first tractor unit for the purpose of reducing the risk of over-heating of any of said friction clutches during engagement or disengagement of said friction clutches.

By forming the multi-vehicle arrangement from at least two separately drivable tractor units, no expensive specially designed trailer must be manufactured. Instead, two standard tractor units that otherwise are used separately can be combined for performing a special heavy haulage assignment, thus increasing total heavy haulage capacity. The standard tractor units to be connected may be of different types and/or or having different power train specifications. Consequently, heavy haulage assignments can be conducted more flexible, without the use of an expensive special trailer required on the desired location.

Tractor units for heavy haulage are frequently equipped with torque converter transmissions because of their capability of relatively large levels of transmission slip without excessive wear or overheating of the transmission. Torque converter transmissions however due to their inherent design have relatively large friction losses those results in increased fuel consumption. Automatic transmissions based on friction clutches have relatively low friction losses, and consequently also low fuel consumption, but there is an increased risk of overheating of the friction clutch instead, in particular dry friction clutches.

During vehicle start from a still stand state to a rolling state in a friction clutch based heavy haulage arrangement, the friction clutch of each tractor unit will during engagement thereof initially slip until the speed of the heavy haulage arrangement is sufficient to have equal rotation speed of the friction clutch input and output shafts. Taking into account the abnormal loads of the heavy haulage arrangement, and potential road inclination, the friction clutch of each tractor unit experiences severe load, and the risk of overheating of the friction clutch is thus high. In case of multi-vehicle arrangement having at least two separately drivable tractor units, this risk is also high due to lack of synchronisation of the clutch load of each tractor unit. The front tractor unit may for example operate on maximal power, whereas the following tractor unit only operates on 50% of full power. This situation quickly results in damages to the friction clutch of the front tractor unit. A similar situation may of course occur during disengagement of the friction clutches.

For the purpose of preventing overload of the friction clutch of any of the tractor units according to the invention, the control system of the first tractor unit is arranged to control the clutch load of said friction clutches for the purpose of reducing the risk of over-heating of any of said friction clutches of said first and second tractor units during engagement or disengagement of said friction clutches.

The control system may be arranged to control said friction clutch of each of said tractor units such that a relative clutch load of each friction clutch does not differ more than a certain amount.

The control system may further be arranged to at least between phases of gear shifts synchronise a relative drive torque of each of said tractor units.

The control system may further be arranged to control transmission mode of said automatic transmission of each of said tractor units.

The control system may further be arranged to control the braking system of each of said tractor units, for the purpose of equalising the braking load of each of said tractor units.

The control system may further be arranged to execute asynchronous gear shift of said automatic transmission of each of said tractor units, such that at least one tractor unit propels the multi-vehicle arrangement during gear shift phases of another tractor unit.

The multi-vehicle arrangement may operate in a master/slave configuration, wherein said second tractor unit is slaved to the control output of the control system of the first tractor unit.

The control system of said first tractor unit may further be arranged to control at least a clutch energy level of said friction clutch of each of said first and second tractor units by means of taking into account also clutch slipping time of each friction clutch for the purpose of reducing the risk of overheating of any of said friction clutches.

The control system preferably takes into account individual friction clutch upper limit energy level of each of said friction clutches when controlling said clutch load of each friction clutch.

The control system preferably takes into account an individual power dissipation rate of each friction clutch when controlling said clutch load of each friction clutch.

Steering direction, torque request and deceleration request of said first tractor unit are adapted to be provided by a driver of said first tractor unit, and steering direction and preferably also hand brake of said second tractor unit are adapted to be provided by a driver of said second tractor unit.

BRIEF DESCRIPTION OF THE DRAWINGS

The present invention will now be described in detail with reference to the figures, wherein.

DETAILED DESCRIPTION

In the following only one embodiment of the invention is shown and described, simply by way of illustration of one mode of carrying out the invention. The same reference sign is used for indicating the same functional item of each vehicle.

Figure 1:
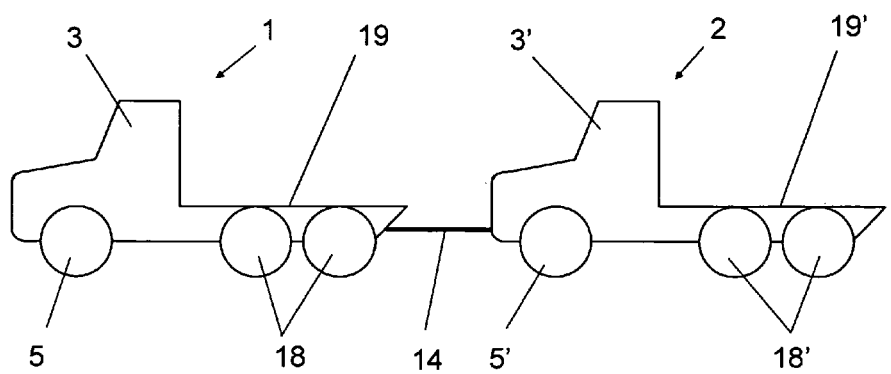
FIG. 1 shows a multi-vehicle arrangement for heavy haulage according to the invention.

FIG. 1 shows schematically a multi-vehicle arrangement for heavy haulage comprising at least a first tractor unit 1 mechanically connected with a second tractor unit 2. The mechanical connection device 14 used for interconnection of the tractor units 1, 2 is preferably formed by a rigid rod or beam that can withstand high tension and buckling forces that may occur during operation of the multi-vehicle arrangement. Alternating tension and compression forces will for example act on the mechanical connection device 14 when asynchronous gear changes in the first and second tractor units 1, 2 occur.

An important aspect of the invention is the use of standard tractor units for forming the multi-vehicle arrangement according to the invention, wherein each tractor unit 1, 2 is adapted to be at least partly controlled by a driver. The use of standard tractor units 1, 2 results in a more economical and flexible heavy haulage solution because no costly specially designed or manufactured motive trailers are required, and access to an additional tractor unit is mostly gained quick and easy. After finished heavy haulage assignment, the tractor units 1, 2 may be divided again, whereafter they are directly prepared for other joint or separate assignments.

Figure 2:
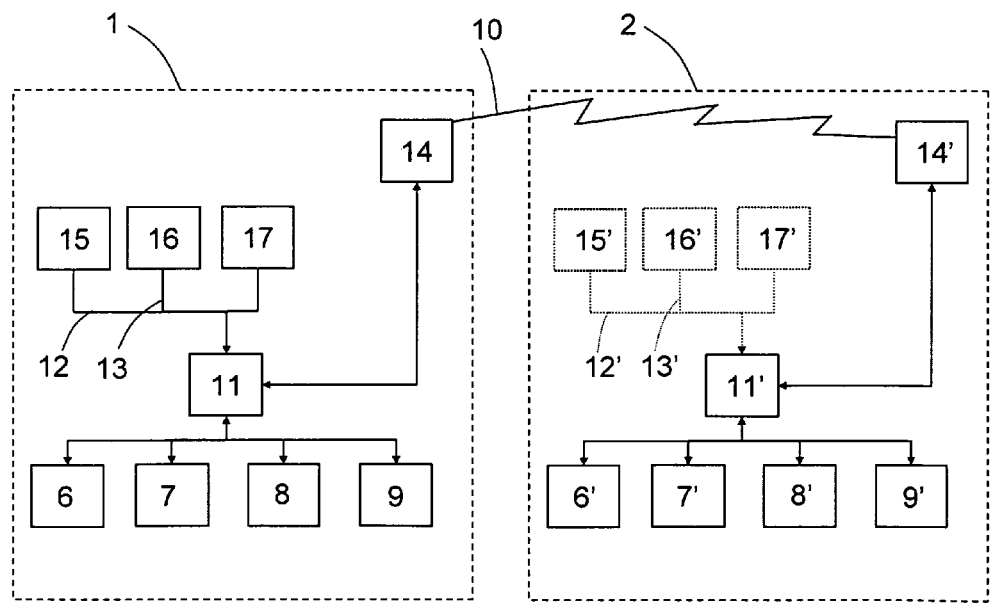
FIG. 2 shows a function block diagram of the multi-vehicle arrangement for heavy haulage according to the invention

The term standard tractor unit, or truck, encompasses a motor vehicle, more specifically a commercial vehicle commonly used for hauling, and transporting goods and materials, wherein the tractor units are designed and adapted to be mainly operated separately by means of driver. Hence, a motive trailer according to the prior art is not considered to represent a standard tractor unit. A standard tractor unit 1, 2 forms a separately drivable tractor unit 1, 2, and comprises at least a driver cab 3, 3', in which the driver of the tractor unit is seated, steering wheels 5, 5', rear wheels 18, 18', and a rear portion 19, 19' for coupling to a trailer. As illustrated in FIG. 2, a standard tractor unit 1, 2 further comprises a braking system 6, 6', and a power train comprising a power source 7, 7', a friction clutch 8, 8', and an automatic transmission 9, 9'.

The friction clutch 8, 8' is arranged to be disengaged or engaged for drive torque transmission from said power source 7, T to said automatic transmission 9, 9'.

The friction clutch 8, 8' is preferably a dry friction clutch, but could alternatively also be a wet friction clutch. The friction clutch 8, 8' is preferably part of an automatic transmission 9, 9', also called automated manual transmission (AMT), which is a system that uses electronic sensors, pneumatics, processors and actuators to execute gear shifts on the command of the driver or by a computer. Automatic control of the friction clutch 8, 8' is normally included in the automatic transmission 9, 9'. Hence, a tractor unit 1, 2 having an automatic transmission normally have no clutch actuator for the driver, all gear shifts and clutch actuations are performed by actuators within the automatic transmission, and controlled by a control system 11, 11'.

Vehicle powertrains generate drive torque that is transferred through a vehicle driveline to propel the vehicle. The powertrain typically includes a power source 7, T including, but not limited to, an internal combustion engine and/or an electric machine. Operation of the power source 7, 7' is often regulated using a torque-based control system, wherein driver actuation of a accelerator pedal 15, 15' is interpreted as a drive torque request 12, 12' and the power source 7, 7' is regulated to achieve the drive torque request 12, 12'. Driver actuation of a brake pedal 16, 16' is interpreted as a deceleration request 13, 13' and the braking system 6, 6', in particular a electronic braking system EBS, controls the main and auxiliary brakes to correspond to the received deceleration request 13, 13'. In FIG. 2, only electronic control lines are illustrated between the accelerator pedal 15, 15', brake pedal 16, 16', transmission mode selector 17, 17', and the control system 11, 11'. A non-shown pneumatic brake system is normally also a part of the total brake system 6, 6'.

Each tractor unit 1,2 further comprises a digital communication device 4, 4' for establishing a digital communication link 10 between said first and second tractor units 1, 2. The digital communication link 10 may for example be wireless communication link, such as for example a wireless local area network WLAN, or realised by interconnecting the CAN-busses of each tractor unit 1, 2, or by means of physical cables routed via the mechanical connection device 14, or the like. The digital communication device 4 of each tractor unit 1, 2 that is used to establish the digital communication link 10 between the first and second tractor units 1, 2 is vital because the control system 11 of said first tractor unit 1 is according to the invention arranged to control at least a clutch load of both said friction clutch 8 of said first tractor unit 1 and said friction clutch 8' of said second tractor unit 2. The control system 11 of said first tractor unit 1 is thus adapted to control the clutch load of both said friction clutches 8, 8'. The main aim of this arrangement is to reduce the risk of over-heating of any of said friction clutches 8, 8' of said first and second tractor units 1, 2 during engagement or disengagement of said friction clutches 8, 8'.

Steering direction, torque request 12 and deceleration request 13 of said first tractor unit 1 are adapted to be provided by a driver of said first tractor unit 1. Due to the control of at least power source 7' and friction clutch 8' by means of the control system 11 of the first tractor unit 1, only steering direction and preferably also hand brake of said second tractor 2 unit are adapted to be provided by a driver of said second tractor unit 2. Torque request 12', and preferably also deceleration request 13' of said second tractor unit 2 are adapted to be provided by the control system 11 of said first tractor unit 1. This is illustrated by dotted electronic control lines between the accelerator pedal 15', brake pedal 16', transmission mode selector 17', and the control system 11' in FIG. 2.

Without such synchronised clutch load control of the friction clutches 8, 8' of said tractor units 1, 2 of the multi-vehicle arrangement, the individual clutch load of each friction clutch 8, 8' will most likely diverge to a large extent, depending on the control input 12, 12', 13, 13' received from the drivers of said tractor units 1, 2. For example, consider two interconnected tractor units 1, 2 without synchronised clutch loads. Then the driver of each tractor unit 1, 2 individually controls the clutch load of each tractor unit 1, 2 by means of more or less torque request 12, 12'. The driver of the first tractor unit 1 may thus give maximal torque request 12 whereas the driver of the second tractor unit 2 may give 50% of maximal torque request 12'. This situation may consequently quickly lead to overheating of the friction clutch 8 of the first tractor unit 1.

The invention aims to prevent such unequal clutch load of the individual friction clutches 8, 8' by controlling also of the clutch load of the friction clutch 8' of the second tractor unit 2 by means of the control system 11 of the first tractor unit 1. The driver of the second tractor unit 2 does thus not have control over the clutch load of the friction clutch 8' of the second tractor unit 2 in this mode.

Clutch load is here defined as a function of clutch input torque M and clutch slip speed ω5 HP, whereby clutch load equals M multiplied with ω5πρ (clutch load=M×ωosiip). The clutch input torque M essentially corresponds to output torque of the power source 7, T except potential small losses. Clutch slip speed ω3πρ, is derived from rotation speed of clutch input shaft ω,η minus rotation speed of clutch output shaft u (ω5üP=ω,η~odout).

The control of the clutch load thus involves control of both the friction clutch engagement actuator, which controls torque transmission capability of the friction clutch 8, 8' and thus determines level of clutch slip speed ω8πρ, and clutch input torque M, which essentially corresponds to the output torque of the power source 7, 7'. The control system 11 of the first tractor unit 1 controls the power source 7 and friction clutch 8 based on the torque request 12 of the driver of the first tractor unit 1. The control system 11 of the first tractor unit 1 thus also controls the clutch load of the friction clutch 8 of the first tractor unit 1 based on the definition of the clutch load above. To realise a synchronised clutch load of each friction clutch 8, 8' of the multi-vehicle arrangement, the control system 11 of the first tractor unit 1 is arranged to control the clutch load of the friction clutch 8' of the second tractor unit 2 as well. This control may be implemented in many different ways, of which one is disclosed in FIG. 2. Here, a master/slave control is used, wherein the control system 11 of the first tractor unit 1 operates as master controller and the control system 11' of the second tractor unit 2 operates as slave controller. The control system 11' of the second tractor unit 2 thus operates based on the control output of the control system 1 of the first tractor unit 1 instead of the driver of the second tractor unit 2. This arrangement allows good synchronisation of the clutch load of each tractor unit 1, 2, and therefore reduces the risk of overheating and further damages of the friction clutches 7, T.

Note that FIG. 2 only schematically illustrates the tractor units 1, 2, and that the structure of the functional blocks in FIG. 2 may be realised in many different ways. For example, the control systems 11, 11' may be composed of several different more or less interconnected control units, which are more or less associated with one or more of the functional blocks. The functional blocks may also be more or less integrated with each other. The friction clutch 8, 8' and transmission 9, 9' may for example advantageously be integrated into a single unit due to their close operational relationship. The control system 11, 11' may for example be mainly associated with the clutch/transmission unit, which control system 11, 11' further controls the power source 7, 7' via a separate engine control unit.

To increase flexibility, the first and second tractor units 1, 2 can be interconnected to form a multi-vehicle arrangement according to the invention despite being of different types, and having different power train components. In case of control of an absolute clutch load, the control system 11, 11' is arranged to control clutch load in terms of absolute numbers, such as Joule/second, i.e. the absolute clutch loads of the first and second tractor units 1, 2 should not differ more than a certain amount, and preferably being substantially equal. However, when combining two or more tractor units 1, 2 having dissimilar power trains, the control of absolute clutch load may lead to decreased synchronisation level, in particular when combining a more powerful tractor unit 1, 2 with a less powerful tractor unit 1, 2. To avoid such a decreased synchronisation level, the control system 11 of the first tractor unit 1 may be arranged to control a relative clutch load instead of an absolute clutch load, such that the relative clutch loads of said friction clutches 8, 8' do not differ more than a certain amount. The relative clutch load is preferably parameterised as percentage from 0-100%, where 100% corresponds to the maximal absolute transferable clutch load of each specific friction clutch 8, 8'.

The control system 11 of the first tractor unit 1 is configured to prevent the absolute or relative clutch load of each friction clutch 8, 8' from differing more than a certain amount. The level of difference may be given in terms of percentage of clutch load, or an absolute clutch load, or the like. For example, the control system 11 of the first tractor unit 1 is configured to prevent the absolute or relative clutch load of each friction clutch 8, 8' from differing more than 30%, preferably less than 20%, and more preferably less than 10%. Most preferably, the control unit 11 of said first tractor unit 1 is configured such that the absolute or relative clutch load of each friction clutch 8, 8' is substantially equal.

The control system 11 of said first tractor unit 1 is configured to control not only an instantaneous clutch load level, but the clutch energy level E of said friction clutches 8, 8' of said tractor units 1, 2. The clutch energy level E of each friction clutch 8, 8' is based on the instantaneous clutch load level multiplied with clutch slipping time tSLIP, i.e. E=Clutch load×tSLIP. Taking into account also the slipping time tSLIP of each individual friction clutch 8, 8' of the multi-vehicle arrangement, a more accurate friction clutch synchronisation may be accomplished, and the risk of over-heating of any of said friction clutches 8, 8' is further reduced. If the control system 11 of the first tractor unit 1 subsequently also takes into account an individual power dissipation rate of each friction clutch 8, 8' when controlling said clutch load of each friction clutch 8, 8', an individual energy level E of each friction clutch 8, 8' may be stored and updated in a memory of the control system 11 of the first tractor unit 1. This particular arrangement can be advantageous when several consecutive starts of the multi-vehicle arrangement are executed, between which starts the energy level E of the friction clutches 8, 8' remain at an elevated level. The individual power dissipation rate of a friction clutch 8, 8' relates to what extent the friction clutch 8, 8' can transfer heat energy to the surroundings. Preferably, the control system 11 of the first tractor unit 1 takes into account an individual friction clutch upper limit energy level $E_{limit}$ of each of said friction clutches 8, 8' when controlling said clutch load of each friction clutch 8, 8', such that no friction clutch 8, 8' risks being damaged or overheated during engagement or disengagement.

The control system 11 of the first tractor unit 1 is further configured to synchronise a drive torque of each of said tractor units 1, 2 for the purpose of reducing wheel slip of any of the tractor units 1, 2, and to distribute the total drive torque of the multi-vehicle arrangement between the individual tractor units 1, 2. The relative drive torque is synchronised to allow efficient combination of tractor units 1, 2 of different power train specifications. In case asynchronous gear changes are applied by the tractor units 1, 2, the drive torque synchronisation is of course possible only between phases of gear shifts.

The control system 11 of the first tractor unit 1 is further configured to control also a transmission mode of said automatic transmission 9, 9' of each of said tractor units 1, 2. Each automatic transmission 9, 9' may include several different transmission modes, which are adapted for specific purposes, such as heavy haulage, fully loaded vehicle, empty vehicle, snow, economy, etc., and the drive of said first tractor unit 1 selects the desired operation mode by means of a transmission mode selector 17 arranged within the cab 3 of said first tractor unit 1. Each transmission mode involves selection of a specific start gear, selection of appropriate gear sequences, engine speed and torque that triggers gear changes, etc. Consequently, each automatic transmission 9, 9' controlled by the control system 11 of the first tractor unit 1 will operate in the same transmission mode, if possible.

The control system 11 of the first tractor unit 1 is further configured to control the braking system 6, 6' of each of said tractor units 1, 2, for the purpose of equalising the braking load between said tractor units 1, 2. This relate in particular to the main friction brakes of each tractor unit 1, 2 and serves the purpose of preventing the friction brakes of a single tractor unit 1, 2 from overheating whereas the friction brakes of the of the other tractor unit 1, 2 are far from becoming overheated. Also retarders and/or engine brakes are preferably synchronised for improved distribution of wear and heat occasioned by deceleration of the abnormal load. The hand brake and steering of the second tractor unit 2 may remain under control of the driver of the second tractor unit 2 giving the driver thereof a small amount of control of the vehicle in case a system error should occur. Alternatively, or in combination, activation of the driver control means', such as accelerator pedal 15' and braking pedal 16' in said second tractor unit 2 may interrupt the master/slave mode of the multi-vehicle arrangement for safety reasons.

A benefit following from the control of the both clutch loads and automatic transmissions by a control system 11 of a single tractor unit 1 is the possibility to execute asynchronous gear shift of said automatic transmissions 9, 9' of said tractor units 1, 2. The result of such asynchronous gear shifts is that at least one tractor unit 1, 2 always propels the multi-vehicle arrangement during gear shift phases of another tractor unit 1, 2 of the arrangement, thus providing power shifts, which leads to improved driver comfort and more continuous drive torque of the multi-vehicle arrangement.

Setup and operation of the multi-vehicle arrangement is preferably executed by the following steps: Arranging the first and second separately drivable tractor units 1, 2 in line and interconnecting the first and second tractor units 1, 2 by means of mechanical connection device 14, which is adapted to transfer significant tension and compression forces. Providing a digital communication link 10 between said tractor units 1, 2 by means of said digital communication devices 4, 4'. Enter a master/slave mode where the control system 11 of the first tractor unit 1 is configured to control at least a clutch load of said friction clutch 8, 8' of each of said first and second tractor units 1, 2, thereby reducing the risk of over-heating of any of said friction clutches 8, 8' during engagement or disengagement of said friction clutches 8, 8'. Furthermore, the control system 11 of the first tractor unit 1 is preferably configured to control also the braking system 6, 6', as well as the automatic transmission mode of both tractor units 1, 2. At take off, the control system 11 of the first tractor unit 1 receives a torque request 12 from the driver of the first tractor unit 1, and controls based thereon the power source 7, 7', friction clutch 8, 8', and automatic transmission 9, 9' of both the tractor units 1, 2, such that the clutch load of the friction clutch 8 of the first tractor unit 1 does not differ more than a certain amount from the clutch load of the friction clutch 8' of the second tractor unit 2 during engagement of said friction clutches 8, 8'. During the master/slave mode, the driver of the second tractor unit 2 controls steering of the second tractor unit 2, but not the power train thereof.

After the multi-vehicle arrangement has reached a speed that triggers the control system 11 of the first tractor unit 1 to initiate a gear change, the drive torque of only one of the tractor units 1, 2 is suspended, gear change is executed, and the associated friction clutch 8, 8' is engaged again to deliver drive torque to the multi-vehicle arrangement. Short thereafter, the same procedure occurs in the other tractor unit 1, 2. By means of the asynchronous gear changes, power shift is realised, which improves driver comfort, fuel economy and driving performance. In case a deceleration request 13 from the driver is received by the control system 11 of the first tractor unit 1, the control system 11 of the first tractor unit 1 controls at least the main friction brakes of the braking system 6, 6' of both the first and second tractor units 1, 2 such that efficient, substantially equally distributed, and safe deceleration of the multi-vehicle arrangement is provided.

The term master/slave is herein considered to encompass a control mode where the control system 11 of the first tractor unit 1 takes over control of several functions of the second tractor unit 2. The control system 11 of the first tractor unit 1 may for example transmit instructions to the control system 11' of the second tractor unit 2, such that the driver of the second tractor unit 2 no longer has control over for example power source 7', friction clutch 8', and automatic transmission 9'.

The term tractor unit is herein considered to encompass primarily a road based semi-trailer truck configured to pull a semi-trailer by means of a quick-release coupling device arranged on the rear portion of the tractor unit. In case the trailer used for heavy haulage is complete trailer including front wheels, the term may also include other types of commercial vehicles that are able to pull such a heavy haulage trailer.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims.

Accordingly, the drawings and the description thereto are to be regarded as illustrative in nature, and not restrictive.

| Table of reference signs | |
|---|---|
| 1 | First tractor unit |
| 2 | Second tractor unit |
| 3, 3' | Driver cab |
| 4, 4' | Digital communication device |

-continued

Table of reference signs

| | |
|---|---|
| 5, 5' | Steering wheel |
| 6, 6' | Braking system |
| 7, 7' | Power source |
| 8, 8' | Friction clutch |
| 9, 9' | Automatic transmission |
| 10 | Digital communication link |
| 11, 11' | Control system |
| 12, 12' | Torque request |
| 13, 13' | Deceleration request |
| 14 | Mechanical connection device |
| 15, 15' | Accelerator pedal |
| 16, 16' | Brake pedal |
| 17, 17' | Transmission mode selector |
| 18, 18' | Rear wheels |
| 19, 19' | Rear portion of tractor unit |
| M | Clutch input torque |
| $\omega_{3\pi\rho}$ | Clutch slip speed |
| $\omega_{in}$ | Rotation speed of clutch input shaft |
| Wout | Rotation speed of clutch output shaft |
| E | Clutch energy level |
| Elimit | Friction clutch upper limit energy level |
| tslip | Clutch slipping time |

The invention claimed is:

1. Multi-vehicle arrangement for heavy haulage comprising at least a first tractor unit mechanically connected with a second tractor unit, wherein each tractor unit forms a separately drivable tractor unit comprising a driver cab, a digital communication device, steering wheels, a braking system, and a power train comprising a power source, a friction clutch, and an automatic transmission, where the friction clutch is arranged to be disengaged or engaged for drive torque transmission from the power source to the automatic transmission, a digital communication link is providable between the tractor units by means of the digital communication devices, and a control system of the first tractor unit is arranged to control at least a clutch load of the friction clutch of each of the first and second tractor units for the purpose of reducing the risk of over-heating of any of the friction clutches during engagement or disengagement of the friction clutches.

2. Multi-vehicle arrangement according to claim 1, wherein the control system of the first tractor unit is arranged to control the friction clutch of each of the tractor units such that a relative clutch load of the friction clutch (8) of the first tractor unit does not differ more than a certain amount from a relative clutch load of the friction clutch of the second tractor unit.

3. Multi-vehicle arrangement according to claim 1, wherein the control system of the first tractor unit further is arranged to at least between phases of gear shifts synchronise a relative drive torque of each of the tractor units.

4. Multi-vehicle arrangement according to claim 1, wherein the control system of the first tractor unit further is arranged to control transmission mode of the automatic transmission of each of the tractor units.

5. Multi-vehicle arrangement according to claim 1, wherein the control system of the first tractor unit further is arranged to control the braking system of each of the tractor units, for the purpose of equalising the braking load of each of the tractor units.

6. Multi-vehicle arrangement according to claim 1, wherein the control system of the first tractor unit further is arranged to execute asynchronous gear shift of the automatic transmission of each of the tractor units, such that at least one tractor unit propels the multi-vehicle arrangement during gear shift phases of another tractor unit.

7. Multi-vehicle arrangement according to claim 1, wherein the multi-vehicle arrangement operates in a master/slave configuration, wherein the second tractor unit is slaved to the control output of the control system of the first tractor unit.

8. Multi-vehicle arrangement according to claim 1, wherein the control system of the first tractor unit is farther arranged to control at least a clutch energy level of the friction clutch of each of the first and second tractor units by means of taking into account also clutch slipping time (tSiiP) of each friction clutch for the purpose of reducing the risk of over-heating of any of the friction clutches.

9. Multi-vehicle arrangement according to claim 8, wherein the control system of the first tractor unit takes into account individual friction clutch upper limit energy level of each of the friction clutches when controlling the clutch load of each friction clutch.

10. Multi-vehicle arrangement according to claim 8, wherein the control system of the first tractor unit takes into account an individual power dissipation rate of each friction clutch when controlling the clutch load of each friction clutch.

11. Multi-vehicle arrangement according to claim 1, wherein steering direction, torque request and deceleration request of the first tractor unit are adapted to be provided by a driver of the first tractor unit, and steering direction and preferably also hand brake of the second tractor unit are adapted to be provided by a driver of the second tractor unit.

12. Method of operating a multi-vehicle arrangement for heavy haulage comprising at least a first tractor unit mechanically connected with a second tractor unit, comprising
providing each tractor unit as a separately drivable tractor unit comprising at least a driver cab, a digital communication device, steering wheels, a braking system, and a power train comprising a power source, a friction clutch, and an automatic transmission, where the friction clutch is arranged to be disengaged or engaged for drive torque transmission from the power source to the automatic transmission;
providing a digital communication link between the tractor units by means of the digital communication devices; and
controlling at least a clutch load of the fiction clutch of each of the first and second tractor units by means of a control system of the first tractor unit for the purpose of reducing the risk of over-heating of any of the friction clutches during engagement or disengagement of the friction clutches.

13. Method according to claim 12, comprising controlling the friction clutch of each of the tractor units such that a relative clutch load of each friction clutch does not differ more than a certain amount.

14. Method according to any of claim 12, comprising providing maintained drive torque of at least one of the tractor units during gear shift phases of another the tractor units, such that propulsion force always is provided to the multi-vehicle arrangement upon registering of a driver torque request of the first tractor unit.

* * * * *